(No Model.)  6 Sheets—Sheet 1.
J. W. LATTIG.
WATCHMAN'S TIME RECORDER.
No. 427,581. Patented May 13, 1890.
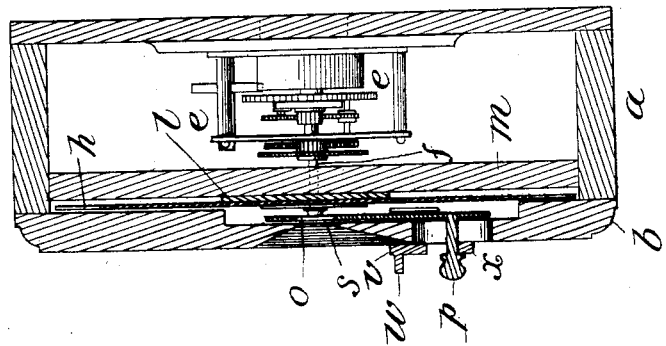
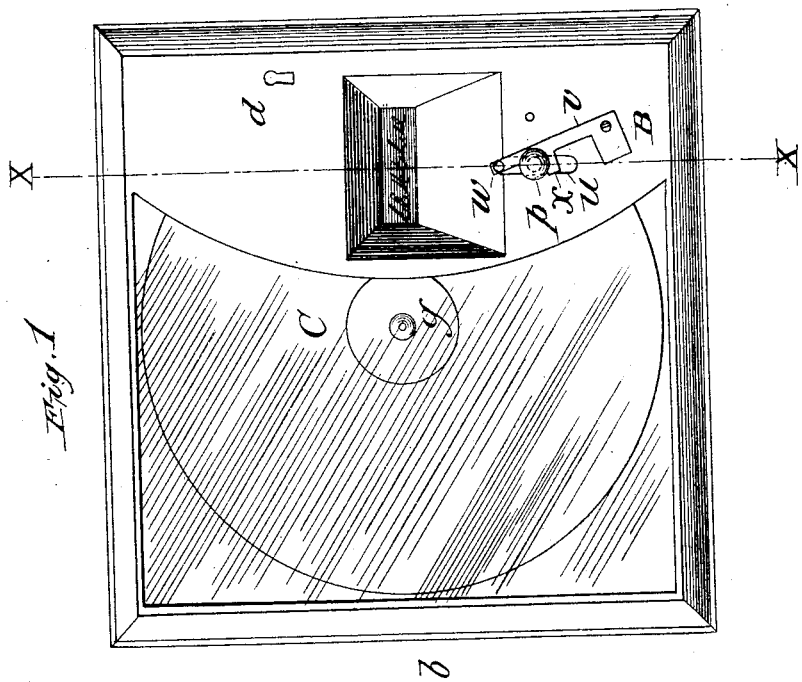
WITNESSES:
INVENTOR
J. W. Lattig
BY
Edward P. Thompson
ATTORNEY (No Model.) 6 Sheets—Sheet 2.

J. W. LATTIG.
WATCHMAN'S TIME RECORDER.

No. 427,581. Patented May 13, 1890.

WITNESSES:

INVENTOR
J. W. Lattig
BY
Edward P. Thompson
ATTORNEY (No Model.) 6 Sheets—Sheet 3.

J. W. LATTIG.
WATCHMAN'S TIME RECORDER.

No. 427,581. Patented May 13, 1890.

WITNESSES:

INVENTOR
J. W. Lattig
BY
Edward P. Thompson
ATTORNEY (No Model.) 6 Sheets—Sheet 4.
J. W. LATTIG.
WATCHMAN'S TIME RECORDER.
No. 427,581. Patented May 13, 1890.
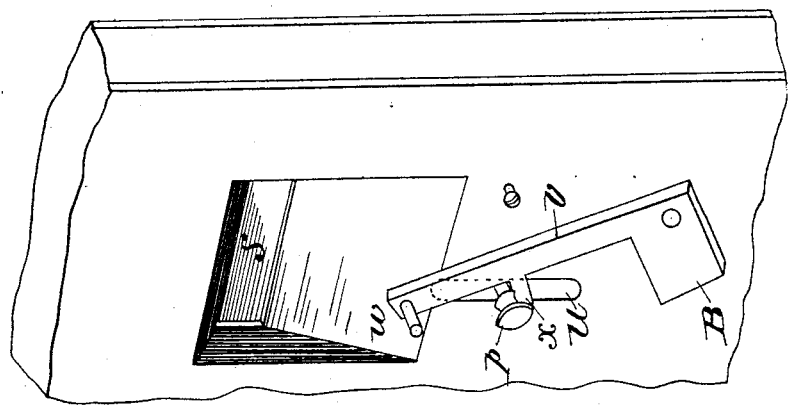
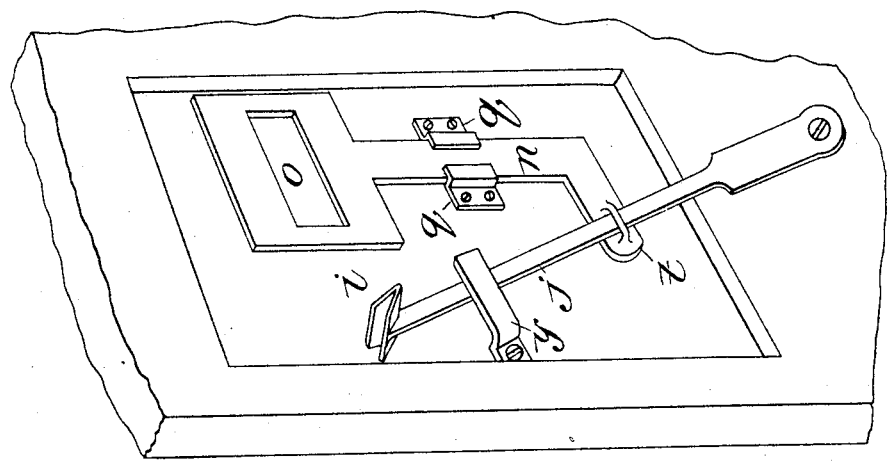
WITNESSES:
INVENTOR
J. W. Lattig
BY
Edward P. Thompson
ATTORNEY (No Model.) 6 Sheets—Sheet 5.

J. W. LATTIG.
WATCHMAN'S TIME RECORDER.

No. 427,581. Patented May 13, 1890.

WITNESSES:
C. W. Benjamin
Edith M. Strowbridge

INVENTOR
J. W. Lattig

BY
Edward P. Thompson
ATTORNEY (No Model.) 6 Sheets—Sheet 6.

J. W. LATTIG.
WATCHMAN'S TIME RECORDER.

No. 427,581. Patented May 13, 1890.

WITNESSES:
C. W. Benjamin
E. M. Stembridge

INVENTOR
J. W. Lattig
BY
Edward P. Thompson
ATTORNEY

UNITED STATES PATENT OFFICE.

JOHN WILLIAM LATTIG, OF SOUTH BETHLEHEM, PENNSYLVANIA.

WATCHMAN'S TIME-RECORDER.

SPECIFICATION forming part of Letters Patent No. 427,581, dated May 13, 1890.

Application filed September 12, 1889. Serial No. 323,736. (No model.)

*To all whom it may concern:*

Be it known that I, JOHN WILLIAM LATTIG, a citizen of the United States, and a resident of South Bethlehem, county of Lehigh, and State of Pennsylvania, have invented certain new and useful Improvements in Watchman's Time-Detectors, of which the following is a specification.

My present invention relates to a watchman's time-detector, and its object is to accomplish results from the watchman that can be depended upon to a greater degree than in the present forms of detectors.

The device embodying my invention is described by reference to the accompanying drawings, in which all the details are represented.

Figure 4:
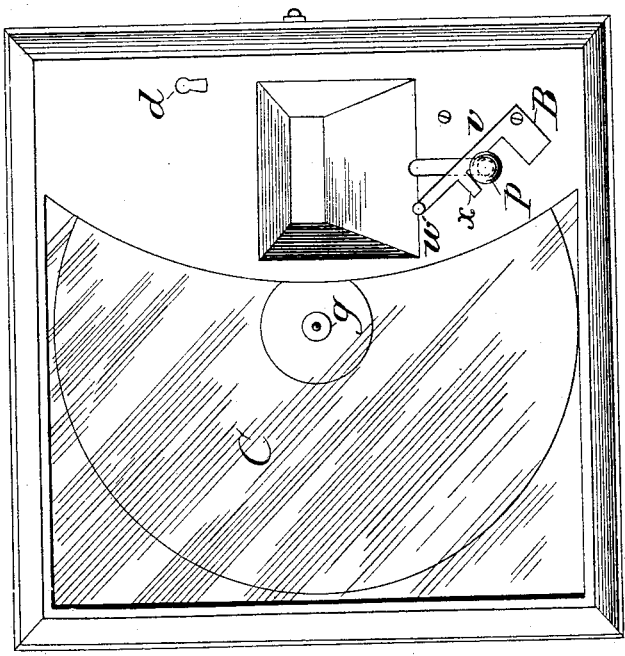
Figure 5:
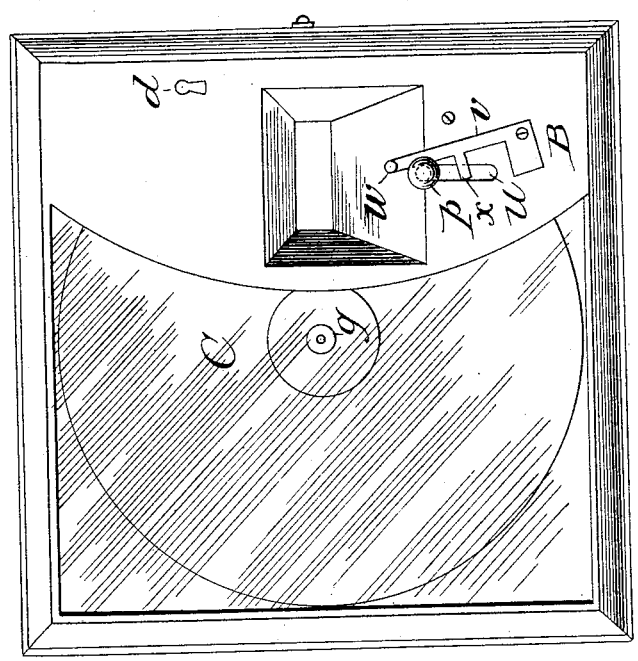
Figure 5:
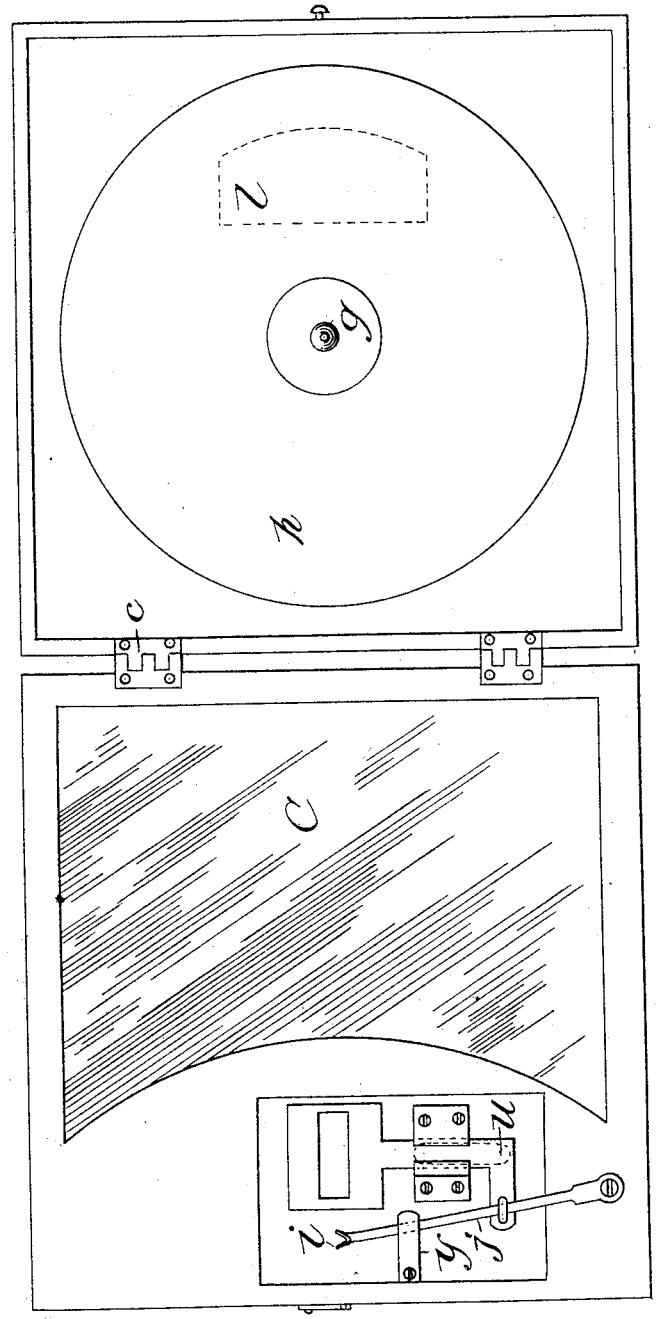
Figure 8:
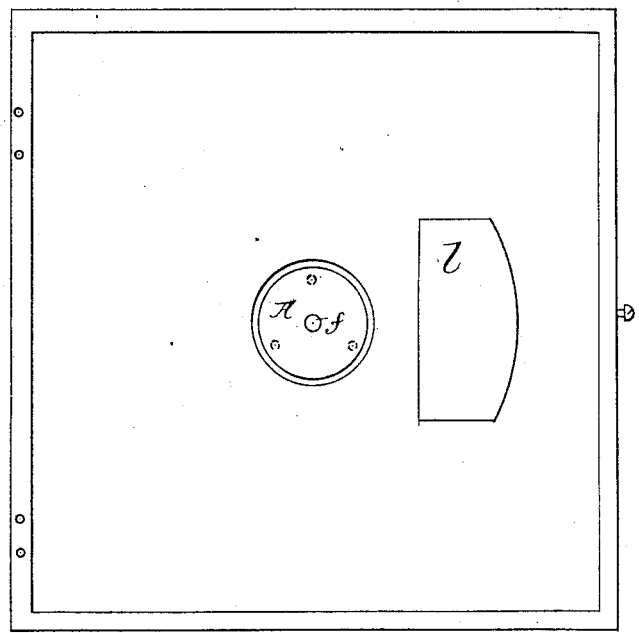
Figure 9:
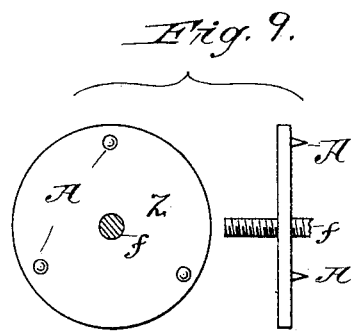
Figure 10:
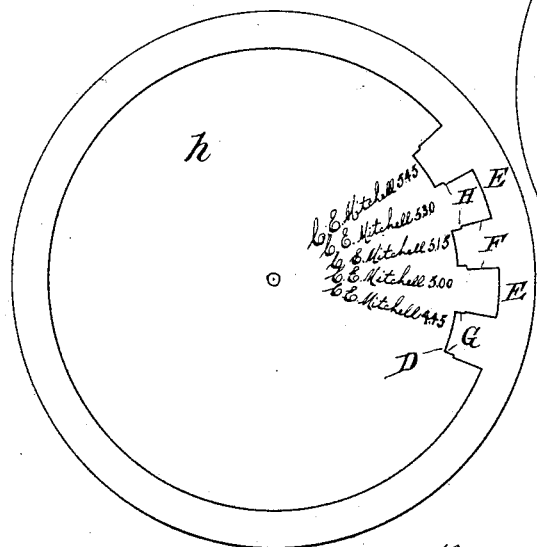
Figure 11:
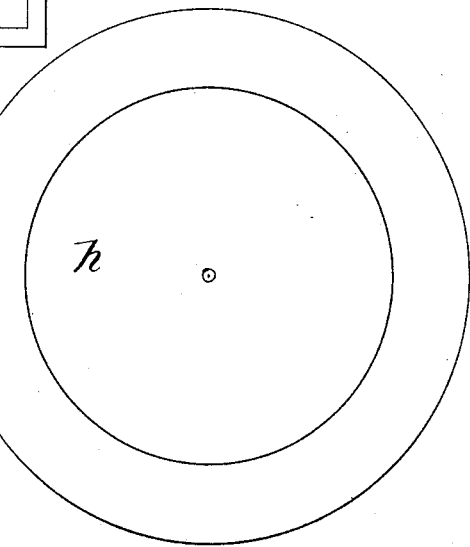
Figure 12:
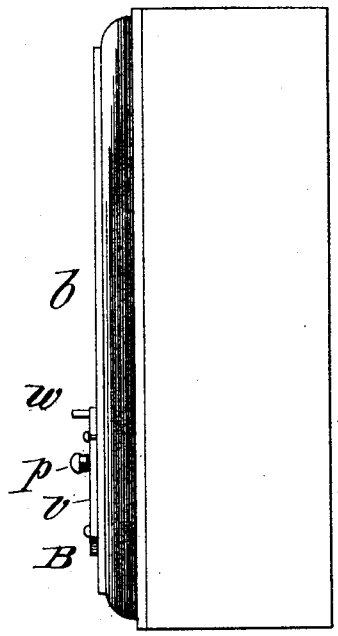
Figure 13:
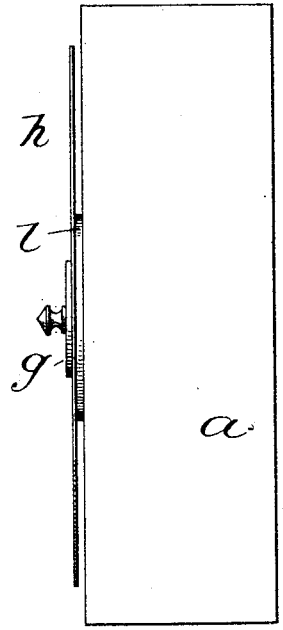
Figure 14:
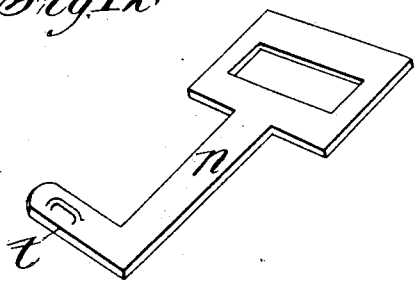
Figure 15:
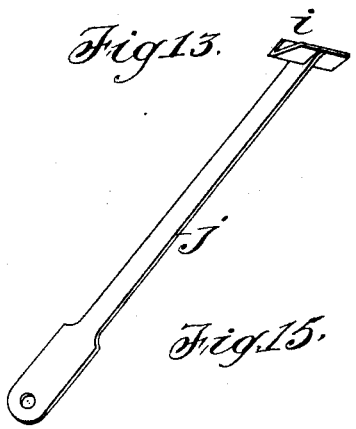
Figure 16:
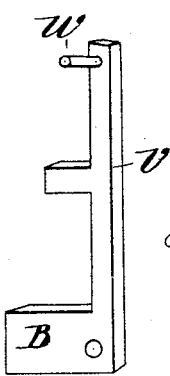

Figure 1 is a front elevation of the exterior view of the complete device after a record has been made by the watchman. Fig. 2 is a cross-sectional view of the device shown in Fig. 1 at the line X. In this figure the operating-clock is represented, but is omitted in the other figures, as it would add to the confusion of understanding the exact nature of the invention. Figs. 3 and 4 are both front elevations, the same as in Fig. 1, except that the instrument in the three different figures are set at various phases. The device embraces a box provided with some of the parts of the device and with a lid carrying the other parts. Fig. 5 shows the said box with its cover open and the instrument set the same as in Fig. 1. Figs. 6 and 7 are perspective views, respectively, of the inside of the cover and of the outside of the cover, portions of the cover in each case being removed by breaking away. Fig. 8 is a view of the box with both the cover and the recording-paper removed, showing particularly the projection for the paper to press against. Fig. 9 shows two different views of a detail of the device. Figs. 10 and 11 show certain records of the pen upon the recording paper or dial. Fig. 12 is a side elevation of the complete device. Fig. 13 is a side elevation of the device with the cover removed. Figs. 14, 15, and 16 are perspectives of details separated from the device.

The device embodying my invention consists of the combination of a box $a$ and its cover $b$, hinged thereto by suitable hinges $c$ and adapted to be locked by a lock—for instance, at the point $d$—clock-work $e$, located within the box $a$ and having a shaft $f$, upon which is attached in any convenient manner, as by a screw $g$, a paper dial $h$, the said dial being flat or parallel with the back surface of the cover or lid when closed, a pen $i$, mounted upon a support $j$, pivoted to the inner surface or side of the cover or lid $b$ and pressing against the outer edge of the dial, the said dial itself pressing upon a projection $l$, attached to the board $m$, which incloses the works $e$ within the box, the projection being located to the right of the shaft $f$, but not as far as the end of the pen where it presses upon the paper dial, a slide $n$, held in grooves $q$, provided with an opening $o$ opposite to the hole $s$, (when moved to a given position,) which is made in the cover $b$, and also provided with a socket $t$, through which passes and is adapted to slide the pen holder or support $j$, a knob or handle $p$, attached to the slide $n$ and projecting through a slot $u$ in the cover $b$, a compound stop $v$, pivoted on the outside of the cover $b$, being provided with a projection or handle $w$ and with a lateral projection $x$, adapted by the rotation of the said stop to come in the path of the handle $p$, whether the handle $p$ is moved upward or downward, and a rest $y$, fastened to the cover $b$ and retaining the spring-support $j$ in an upright and proper position.

The projection $l$ forms a stop for the paper dial while the pen is rubbing against the same, so that the overlapping part of the paper between the said projection and the point of the pen is elastic or springy, thereby forming not a rigid or stiff surface for the pen to write upon, but a surface that will yield to the pressure of the pen. The shaft $f$ has attached to it a disk $z$, which is provided with suitable points A, against which the paper dial may be pressed by the screw $g$, and so that the paper dial need not slip and turn independently of the shaft.

The "compound stop," so called because it may be employed to stop the slide $n$ on its upward or its downward movement, is weighted at its lower left-hand corner by the extra projection B. This weight insures the said stop falling to the left, and thereby throwing the projection x in the way of the handle p.

The manner of operating this device is as follows: The paper dial, consisting of a circular piece of plain white paper or colored paper or similar material or sheet suitable for marking upon, is mounted upon the shaft of the clock and fastened thereby means of the screw-cap q. The door or cover b is then closed and locked, after first charging the pen with ink. The clock is wound up or connected with a motor, whereby it is made to rotate the shaft f with a uniform motion. The handle p is moved to the lowest part of the slot u or to the uppermost part of the slot, it making no difference which as long as the opening s of the cover is closed by the metal or material of the slide n. When the slide exposes the paper through the hole s of the cover, then is the handle p in the middle position as to the slot u and rests either under the projection x or over it, according to whether the handle p has been moved from the bottom or top of the slot, respectively. The watchman is ordered to move the handle p from, say, the top of the slot u to the middle position of the slot, (where it strikes against the projection x,) and to write in his own hand his own signature or mark every fifteen minutes or at equal intervals as and of the length desired by the superintendent, and after writing the name to lift the stop v to the right and move the handle p to the bottom of the slot. When he calls again at the instrument at the end of the interval of, say, fifteen minutes, he is to move the handle p in the opposite direction to the middle of the slot and write his own signature again on the paper through the openings s and o, which, as above explained, are opposite each other, exposing a writing-surface. It is preferred to order him also to record the time of day or night at which he writes his name on the paper. By so doing he records a check upon any deception, as then the time recorded should agree with the lengths of the short curves made by the pen, and which will now be set forth. When the watchman moves the slide by the handle p, so that the latter stands at the center of the slot u, the socket t, embracing the pen support or holder j, causes the latter to move toward the center when the handle p is moved upward and away from the center when the handle is moved downward.

Referring now to Fig. 10, the nature of the resulting record of the pen may be noted. The short inner curves D and the short outer curves E are recorded while the periods of time are transpiring between the calls at the instrument made by the watchman. The radial lines F are made when the pen moves toward or away from the center, and the radial lines G are made under similar circumstances. The very short curves H are recorded by the pen i during the time that the man is writing his name and recording the time of day or night. It is evident that the lengths of the lines E and D are proportional to the periods of time between the operation of the handle p by the watchman. The lengths of the lines D and E therefore serve as a check upon deception of the watchman when taken in connection with the times recorded by him. If he records the times incorrectly by any considerable degree, the periods between the times will not be, as they should be, proportional to the lines D and E. Suppose, for instance, that at the end of one of the periods he forgets and does not enter the time, and at the end of the second period of time he records the time he should have recorded at the first-named time, then will the length of the line E or D be considerably longer than it should be. The man's signature is a proof that he and no one else has operated the instrument, or at least it is a sure proof that he wrote his signature at the times when the lines D, E, F, and G were recorded by the pen i. By providing means therefore for the man to write his signature or mark at the same time he causes the pen i to record marks. The result is that it will be very difficult for the man to have an assistant to go the rounds of the factory or similar place while he can sleep or spend the night even at his own home. He must be there at the end of each period of time to write his signature. As the box is locked by the superintendent, the watchman has no facility to write his names or signatures all at the same time either before or after his assistant may perform the manipulation of the handles p and w.

By "pen" I mean any device equivalent to a pen—such as a pencil or stylus—for making visible marks upon paper, cloth, or similar material.

I claim as my invention—

1. In a watchman's time-detector, the combination of clock-work located in a containing and inclosed box, a circular piece of paper attached to the main shaft of the said clock-work, a cover locked upon and covering said paper, a movable inking-pen pressing upon said paper, a slide engaged with said pen and normally covering a slot provided in the said cover, and a compound stop adapted to limit the movements of the said slide.

2. In a watchman's time-detector, the combination of clock-work mounted in an inclosed box, a disk or dial of paper attached to the main shaft of the clock-work, an adjustable pen pressing upon the said paper projecting from the box and pressing upon the paper between the said pen and the said shaft, a pivoted spring upon which the said pen is fixed, a cover of the box covering the said dial and carrying the said pivoted spring, an opening in the said cover provided with a slide adapted to close and open the said opening, the said slide having a slot, means, such as a handle to said slide, for bringing the two openings opposite each other, and a socket attached to the said slide and engaging with the said spring, a part of the cover over the dial being of glass or similar transparent material.

In testimony that I claim the foregoing as my invention I have signed my name, in presence of two witnesses, this 6th day of September, 1889.

J. WILLIAM LATTIG.

Witnesses:
EDWARD P. THOMPSON,
B. LEWINSON.